(12) United States Patent
Zhang (10) Patent No.: US 11,967,181 B2
(45) Date of Patent: Apr. 23, 2024

(54) METHOD AND DEVICE FOR RETINAL IMAGE RECOGNITION, ELECTRONIC EQUIPMENT, AND STORAGE MEDIUM

(71) Applicant: BOE Technology Group Co., Ltd., Beijing (CN)

(72) Inventor: Menglei Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/435,306

(22) PCT Filed: Feb. 9, 2021

(86) PCT No.: PCT/CN2021/076185
§ 371 (c)(1),
(2) Date: Aug. 31, 2021

(87) PCT Pub. No.: WO2021/164640
PCT Pub. Date: Aug. 26, 2021

(65) Prior Publication Data
US 2022/0383661 A1    Dec. 1, 2022

(30) Foreign Application Priority Data

Feb. 19, 2020   (CN) .......................... 202010102291.0

(51) Int. Cl.
*G06V 10/25*    (2022.01)
*G06T 7/00*     (2017.01)
(Continued)

(52) U.S. Cl.
CPC .......... *G06V 40/197* (2022.01); *G06T 7/0012* (2013.01); *G06V 10/25* (2022.01);
(Continued)

(58) Field of Classification Search
None
See application file for complete search history.

(56) References Cited

U.S. PATENT DOCUMENTS

2019/0110753 A1*  4/2019  Zhang ................... G16H 50/20
2020/0342595 A1* 10/2020  Jia ......................... G06T 7/0012
(Continued)

FOREIGN PATENT DOCUMENTS

CN   107330883 A   11/2017
CN   109840906 A    6/2019
(Continued)

OTHER PUBLICATIONS

PCT/CN2021/076185 international search report and written opinion.

*Primary Examiner* — Idowu O Osifade
(74) *Attorney, Agent, or Firm* — IPro, PLLC (57) ABSTRACT

The present disclosure provides a method and a device for retina image recognition, an electronic equipment, and a storage medium, the method including: acquiring a retinal image; classifying the retinal image by using a first neural network model to obtain an image classification result; if the image classification result meets a preset condition, segmenting the retinal image by using a second neural network model to obtain an image segmentation result; generating a recognition result of the retinal image according to the image segmentation result and in combination with a decision tree model.

18 Claims, 6 Drawing Sheets

(51) Int. Cl.
*G06V 10/26* (2022.01)
*G06V 10/77* (2022.01)
*G06V 10/82* (2022.01)
*G06V 40/18* (2022.01)

(52) U.S. Cl.
CPC ........ *G06V 10/267* (2022.01); *G06V 10/7715* (2022.01); *G06V 10/82* (2022.01); *G06T 2207/20081* (2013.01); *G06T 2207/20084* (2013.01); *G06T 2207/30041* (2013.01); *G06T 2207/30096* (2013.01); *G06V 2201/03* (2022.01)

(56) References Cited

U.S. PATENT DOCUMENTS

2022/0165418 A1* 5/2022 Li .................. G06V 10/7747
2022/0319003 A1* 10/2022 Albrecht ............... G06T 7/62

FOREIGN PATENT DOCUMENTS

| CN | 109859184 A | 6/2019 |
| CN | 110298820 A | 10/2019 |
| CN | 110555845 A | 12/2019 |
| CN | 110570407 A | 12/2019 |
| CN | 111325725 A | 6/2020 |

* cited by examiner

METHOD AND DEVICE FOR RETINAL IMAGE RECOGNITION, ELECTRONIC EQUIPMENT, AND STORAGE MEDIUM

CROSS-REFERENCE TO RELATED APPLICATION

This application is the U.S. national phase of PCT Application No. PCT/CN2021/076185 filed on Feb. 9, 2021 which claims priority to Chinese Patent Application No. 202010102291.0 filed on Feb. 19, 2020, the disclosures of which are incorporated in their entirety by reference herein.

TECHNICAL FIELD

The present disclosure relates to the field of data processing technology, and in particular to a method and a device for retina image recognition, an electronic equipment, and a storage medium.

BACKGROUND

At present, the process of recognizing and diagnosing fundus lesions is time-consuming, and due to differences in experience and professional capabilities, doctors are likely to misdiagnose or miss the diagnosis of fundus lesions, especially the initial minimal lesions.

SUMMARY

A first aspect of the embodiments of the present disclosure provides a retina image recognition method which includes:
  acquiring a retinal image;
  classifying the retinal image by using a first neural network model to obtain an image classification result;
  if the image classification result meets a preset condition, segmenting the retinal image by using a second neural network model to obtain an image segmentation result;
  generating a recognition result of the retinal image according to the image segmentation result and in combination with a decision tree model.

Optionally, the image classification result includes a presence of retinopathy and an absence of retinopathy.

Optionally, the preset condition is the presence of retinopathy.

Optionally, the first neural network model is based on an Inception V4 model, and includes an input layer, a basic convolutional layer module, a mixed layer module, a first Inception module, a second Inception module, a third Inception module, an average pooling module, a first convolutional layer, a first identical distribution processing layer, a max pooling layer, a second convolutional layer, a second identical distribution processing layer, and an output layer that are provided sequentially.

Optionally, a loss function of the first neural network model is a cross-entropy function.

Optionally, the second neural network model is based on a Mask R-CNN model.

Optionally, the segmenting the retinal image by using the second neural network model to obtain the image segmentation result includes:
  acquiring a feature map corresponding to the retinal image;
  obtaining multiple regions of interest from the feature map by using a region proposal network algorithm;
  performing region-of-interest alignment processing on each of the regions of interest to obtain an aligned feature map of each of the regions of interest;
  processing the aligned feature map of each of the regions of interest by using a Faster RCNN algorithm based on a fully convolutional network, to obtain classification information of each of the regions of interest, a coordinate position of each of the regions of interest, and a mask of each of the regions of interest.

Optionally, the acquiring the feature map corresponding to the retinal image further includes:
  selecting a module capable of generating feature maps from the trained first neural network model;
  transferring the selected module to the second neural network model to acquire the feature map corresponding to the retinal image; wherein, the selected module includes at least one of a basic convolutional layer module, a mixed layer module, a first Inception module, a second Inception model, and a third Inception module.

Optionally, the image segmentation result includes the classification of the region of interest, the coordinate position of the region of interest, and the mask of the region of interest;
  the classification of the region of interest includes a type of retinopathy.

Optionally, the generating the recognition result of the retinal image according to the image segmentation result and in combination with the decision tree model includes:
  obtaining a degree of retinopathy of the retinal image by using the decision tree model according to the classification of the region of interest;
  obtaining a lesion location and a lesion mask of the retinal image according to the coordinate position of the region of interest and the mask of the region of interest;
  generating a retinal image recognition result including the degree of retinopathy, the type of retinopathy, the lesion location, and the lesion mask.

Optionally, the retinal image recognition method further includes:
  acquiring retinal image samples;
  labeling the retinal image samples;
  making the labeled retinal image samples into a training dataset;
  training the first neural network model, the second neural network model and the decision tree model using the training dataset.

Optionally, the retinal image recognition method further includes: performing image data enhancement processing on the retinal image samples; wherein, methods for the image data enhancement processing includes at least one of: rotating an image, cutting an image, changing a color difference of an image, distorting an image feature, changing an image size, and enhancing image noise.

Optionally, the retinal image recognition method further includes: outputting at least one of the image classification result, the image segmentation result, and the recognition result of the retinal image.

A second aspect of the embodiments of the present disclosure provides a retinal image recognition device which includes:
  an acquisition unit configured to acquire a retinal image;
  a control unit configured to classify the retinal image by using a first neural network model to obtain an image classification result; if the image classification result meets a preset condition, to segment the retinal image by using a second neural network model to obtain an image segmentation result; and, to generate a recognition result of the retinal image according to the image segmentation result and in combination with a decision tree model;

an output unit configured to output at least one of the image classification result, the image segmentation result, and the recognition result of the retinal image.

Optionally, the first neural network model is based on an Inception V4 model, and includes an input layer, a basic convolutional layer module, a mixed layer module, a first Inception module, a second Inception module, a third Inception module, an average pooling module, a first convolutional layer, a first identical distribution processing layer, a max pooling layer, a second convolutional layer, a second identical distribution processing layer, and an output layer that are provided sequentially.

Optionally, a loss function of the first neural network model is a cross-entropy function.

Optionally, the control unit includes: a feature extraction module, a region-of-interest acquisition module, an alignment module, and an output module;

the feature extraction module is configured to acquire a feature map corresponding to the retinal image;

the region-of-interest acquisition module is configured to obtain multiple regions of interest from the feature map by using a region proposal network algorithm;

the alignment module is configured to perform region-of-interest alignment processing on each of the regions of interest to obtain an aligned feature map of each of the regions of interest;

the output module is configured to process the feature map of each of the regions of interest by using a Faster RCNN algorithm based on a fully convolutional network, to obtain a classification of each of the regions of interest, a coordinate position of each of the regions of interest, and a mask of each of the regions of interest.

Optionally, the feature extraction module further includes: a selection module and a transfer module;

the selection module is configured to select a module capable of generating feature maps from the trained first neural network model;

the transfer module is configured to transfer the selected module to the second neural network model as the feature extraction module; wherein, the selected module includes at least one of a basic convolutional layer module, a mixed layer module, a first Inception module, a second Inception model, and a third Inception module.

A third aspect of the embodiments of the present disclosure provides an electronic equipment which includes a storage, a processor, and a computer program stored on the storage and capable of running on the processor, the processor implements, when executing the computer program, the above-mentioned method.

A fourth aspect of the embodiments of the present disclosure provides a non-transitory computer readable storage medium, the non-transitory computer readable storage medium stores computer instructions which are used to make the computer perform the above-mentioned method.

BRIEF DESCRIPTION OF THE DRAWINGS

In order to explain the technical solutions of the embodiments of the present disclosure or the prior art more clearly, the accompanying drawings used in the description of the embodiments or the prior art will be described briefly below. Obviously, the drawings in the following description are only some embodiments of the present disclosure. For those of ordinary skill in the art, other drawings may be obtained based on these drawings without creative labor.

DETAILED DESCRIPTION

In order to make the objectives, technical solutions, and advantages of the present disclosure clearer, the present disclosure will be further described in detail below in conjunction with specific embodiments and with reference to the accompanying drawings.

It should be noted that, unless otherwise defined, the technical terms or scientific terms used in the embodiments of the present disclosure should be the ordinary meanings understood by those with ordinary skills in the field to which the disclosure belongs. The "first", "second" and similar words used in the present disclosure do not indicate any order, quantity or importance, but are only used to distinguish different components. "Comprising" or "including" and other similar words mean that the element or item appearing before the word covers the elements or items and their equivalents listed after the word, but does not exclude other elements or items. Similar words such as "connecting" or "connected" are not limited to physical or mechanical connections, but may include electrical connections, whether direct or indirect. "Up", "down", "left", "right", etc. are only used to indicate the relative position relationship. When the absolute position of the described object changes, the relative position relationship may also change accordingly.

Figure 1:
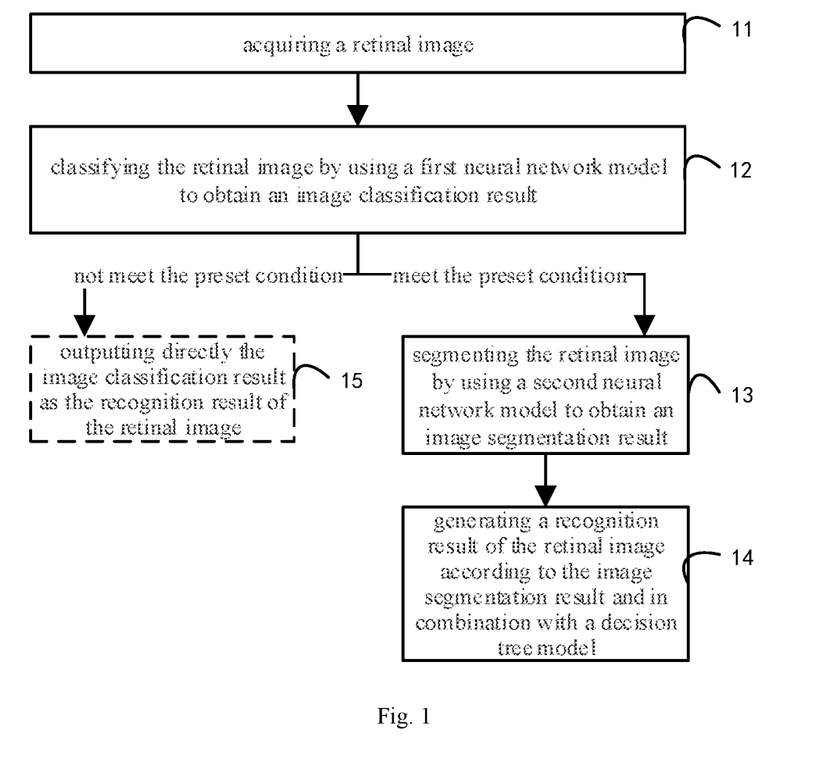
FIG. 1 is a schematic flowchart of a retinal image recognition method according to an embodiment of the disclosure.

FIG. 1 shows a schematic flowchart of a retinal image recognition method according to an embodiment of the disclosure.

As shown in FIG. 1, the retinal image recognition method includes:

Step 11: acquiring a retinal image.

Here, the retinal image may be an image acquired by a professional retinal examination instrument, or an image acquired by any device with an image acquisition function (such as a mobile phone camera), or an image directly acquired from a storage. The retinal image may be a retinal image of a subject (for example, a patient with retinopathy) that requires retinal image recognition, or it may be acquired from a test subject by other personnel engaged in medical research, scientific research, etc.

Step 12: classifying the retinal image by using a first neural network model to obtain an image classification result.

Optionally, the retinal image recognition method can be used to recognize retinopathy, in particular, can be used to recognize diabetic retinopathy. Optionally, the image classification result may include two classifications: retinopathy may be present (for example, the classification label is "1") and retinopathy may be not present (for example, the classification label is "0").

Figure 2A:
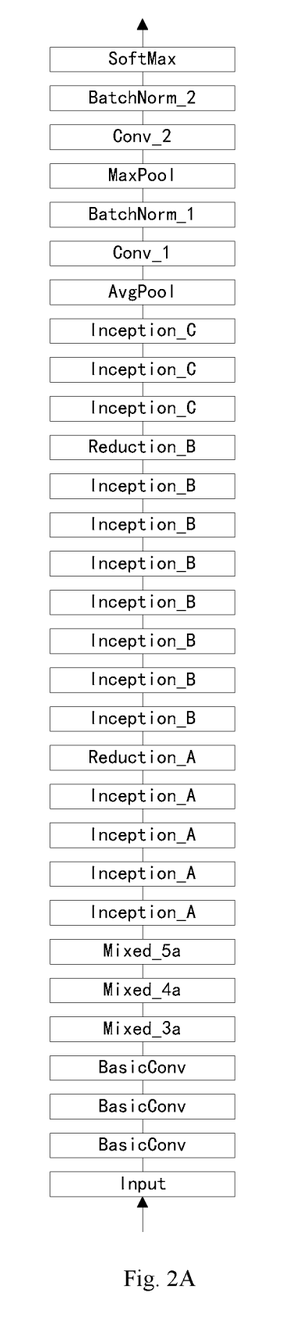
FIG. 2A is a schematic structural diagram of a first neural network model in an embodiment of the present disclosure.

Optionally, the first neural network model is based on an Inception V4 model, and referring to FIG. 2A, the first neural network model includes an input layer Input, a basic convolutional layer module, a mixed layer module, a first Inception module, a second Inception module, a third Inception module, an average pooling module AvgPool, a first convolutional layer Conv_1, a first identical distribution processing layer BatchNorm_1, a max pooling layer MaxPool, a second convolutional layer Conv_2, a second identical distribution processing layer BatchNorm_2, and an output layer Softmax that are provided sequentially; the first neural network model uses a cross-entropy function as a loss function during training, and the loss function is minimized during the training so that the first neural network model is obtained. Wherein, by linking the first convolutional layer Conv_1, the first identical distribution processing layer BatchNorm_1, the maxi pooling layer MaxPool, the second convolutional layer Conv_2, and the second identical distribution processing layer BatchNorm_2 at the end of the Inception V4 model, the preliminary classification of retinal images can be realized better.

As an optional embodiment, referring to FIG. 2A, the basic convolutional layer module includes three basic convolutional layers BasicConv provided sequentially, the mixed layer module includes three mixed layers Mixed_3a, Mixed_4a, and Mixed_5a provided sequentially, the first Inception module includes four first Inception units Inception_A and a first Reduction unit Reduction_A that are provided sequentially, the second Inception module includes seven second Inception units Inception_B and a second Reduction unit Reduction_B that are provided sequentially, and the third Inception module includes three third Inception units Inception_C provided sequentially. It should be noted that the number of layers or units in the basic convolutional layer module, mixed layer module, first Inception module, second Inception module, and third Inception module can be adjusted and deleted as needed. Here, the structures that these modules may have are merely exemplified, and are not intend to limit the protection scope of the present disclosure.

Figure 2B:
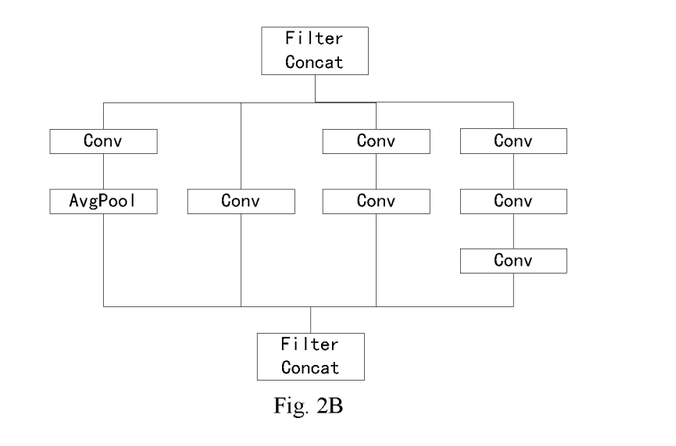
FIG. 2B is a schematic structural diagram of an embodiment of an Inception unit.

Optionally, referring to FIG. 2B, the structure of the first Inception unit Inception_A includes 4 sets of convolutional layers arranged along the width direction of the neural network. Among them, the first set of convolutional layers includes 1 average pooling layer AvgPool and 1 convolutional layer Conv sequentially linked, the second set of convolutional layer includes 1 convolutional layer Conv, the third set of convolutional layers includes 2 convolutional layers Conv sequentially linked, and the fourth set of convolutional layers includes 3 convolutional layers Conv sequentially linked.

Figure 2C:
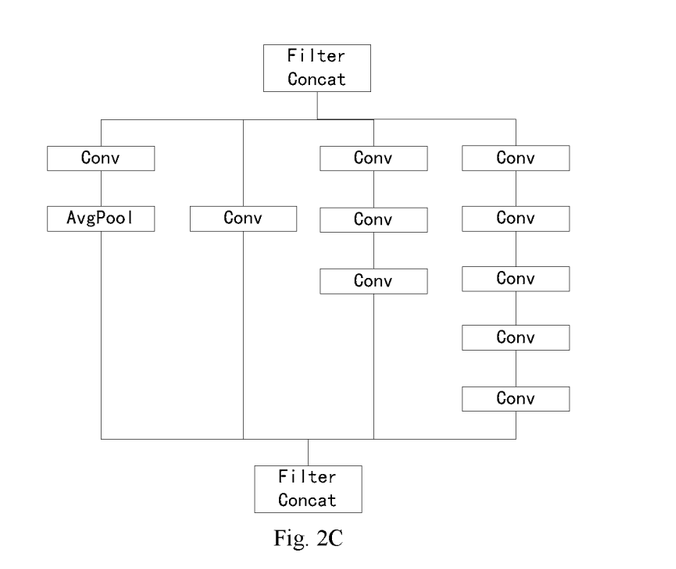
FIG. 2C is a schematic structural diagram of another embodiment of an Inception unit.

Optionally, referring to FIG. 2C, the structure of the second Inception unit Inception_B includes 4 sets of convolutional layers arranged along the width direction of the neural network. Among them, the first set of convolutional layers includes 1 average pooling layer AvgPool and 1 convolutional layer Conv sequentially linked, the second set of convolutional layer includes 1 convolutional layer Conv, the third set of convolutional layers includes 3 convolutional layers Conv sequentially linked, and the fourth set of convolutional layers includes 5 convolutional layers Conv sequentially linked.

Figure 2D:
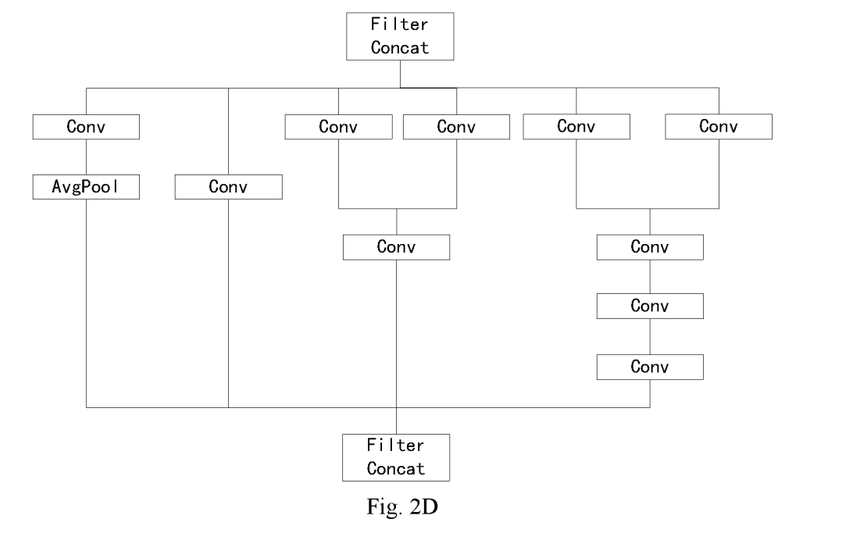
FIG. 2D is a schematic structural diagram of a still another embodiment of an Inception unit.

Optionally, referring to FIG. 2D, the structure of the third Inception unit Inception_C includes 4 sets of convolutional layers arranged along the width direction of the neural network. Among them, the first set of convolutional layers includes 1 average pooling layer AvgPool and 1 convolutional layer Conv sequentially linked, the second set of convolutional layer includes 1 convolutional layer Conv, the third set of convolutional layers includes 1 convolutional layer Conv and a pair of parallel convolutional layers Conv that are sequentially linked along the depth direction of the neural network, and the fourth set of convolutional layers includes 3 convolutional layers Conv and a pair of parallel convolutional layers Conv that are sequentially linked along the depth direction of the neural network.

Referring to FIGS. 2B to 2D, the front ends and the rear ends of the 4 sets of convolutional layers are connected to a previous layer structure and a subsequent layer structure, respectively. The connection Filter Concat just indicates that these 4 sets of convolutional layers need to be connected with the previous and subsequent layer structures, and the connection Filter Concat does not represent an actual layer structure.

It should be noted that, in the Inception model, the specific structure of the Inception unit and the convolution kernel of the convolutional layer can be set as needed. It does not mean that the specific structure provided in this embodiment is the only embodiment of the Inception unit in this disclosure. The specific structure as shown is only exemplary.

Optionally, the cross-entropy function H(p,q) is:

$$H(p,q)=-\Sigma p(x)\log q(x)$$

Cross entropy represents the distance between the actual output (probability) and the expected output (probability), that is, the smaller the value of the cross entropy, the closer the two probability distributions are. Here, the probability distribution p(x) is the expected output, and the probability distribution q(x) is the actual output.

Optionally, the labeled retinal image samples are used to make a training dataset to train the Inception V4 model to minimize the loss function, and to obtain the first neural network model that can realize the preliminary screening function. The label of the retinal image sample may be "present" and "absent", which represent possible presence of retinopathy and possible absence of retinopathy, respectively.

In this way, by using the Inception V4 model to achieve the initial classification, the classification of "present" and "absent" can be realized excellently by virtue of the classification and detection performance of the Inception V4 model, and the classification effect and efficiency are pretty good.

Step 13: if the image classification result meets a preset condition, segmenting the retinal image by using a second neural network model to obtain an image segmentation result.

Optionally, the second neural network model may be created using the Mask R-CNN algorithm. The Mask R-CNN algorithm is a convolutional neural network that can perform target detection on an input image to obtain the type and location of the target, and use a mask to mark the recognized target. By creating the second neural network model based on the Mask R-CNN algorithm, the specific type and location of the retinopathy can be recognized, and the lesion can be marked by the mask accordingly.

Figure 2E:
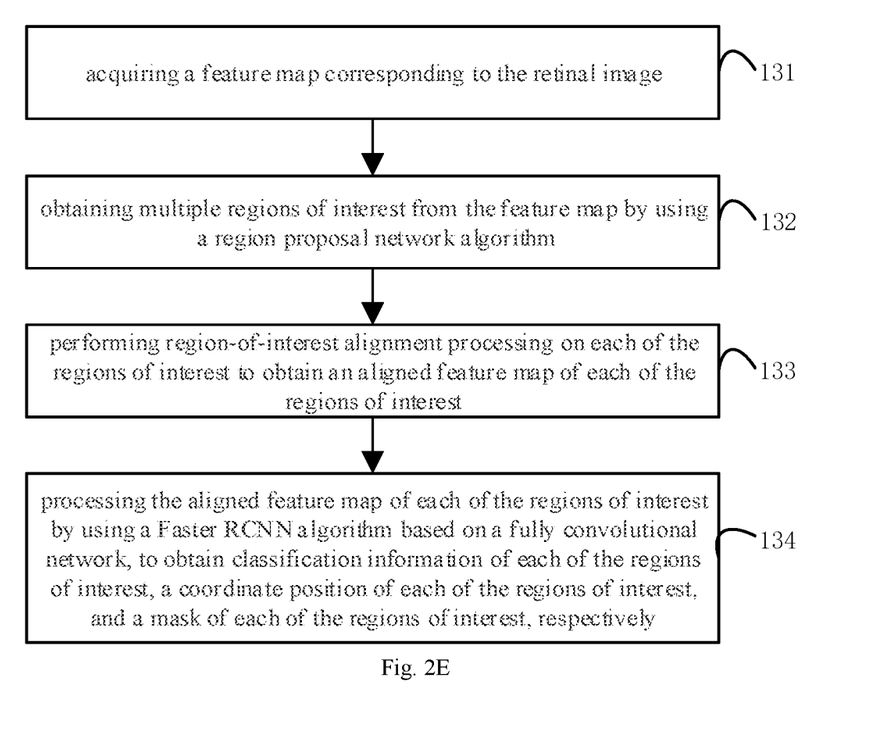
FIG. 2E is a schematic flowchart of segmenting the retinal image by using a second neural network model in the retinal image recognition method according to an embodiment of the disclosure.

As an embodiment, the kernel of the second neural network model uses the Mask R-CNN algorithm; however, there is a certain difference between the overall classification process of the second time and the conventional Mask R-CNN algorithm. Specifically, not the convolutional layers in the conventional Mask R-CNN algorithm, but a part of the structure that has been trained in the first neural network model is used as a portion in the second neural network model for extracting the feature map corresponding to the retinal image. Therefore, as shown in FIG. 2E, Step 13 of segmenting the retinal image by using the second neural network model to obtain the image segmentation result includes:

Step 131: acquiring a feature map corresponding to the retinal image.

The Mask R-CNN algorithm itself has convolutional layers, which can be used to extract the feature map of the image. In this step, the convolutional layers of the Mask R-CNN algorithm can be used to obtain the feature map from the image.

Optionally, the second neural network model includes a feature extraction module, a region-of-interest acquisition module, an alignment module, and an output module; the feature extraction module is configured to acquire the feature map corresponding to the retinal image;

wherein, the feature extraction module is obtained by following:
selecting a module capable of generating feature maps from the trained first neural network model;
transferring the selected module to the second neural network model as the feature extraction module; wherein, the selected module includes at least one of the basic convolutional layer module, the mixed layer module, the first Inception module, the second Inception model, and the third Inception module.

Here, because one of the functions of the convolutional layers in the first neural network model is to generate feature maps, therefore, in the second neural network model, there is no need to provide an additional module for acquiring feature maps, but a module in the first neural network model that has been trained to generate feature maps is transfer-learned directly to the second neural network model, and is used for the second neural network model to generate the feature map of the retinal image. Moreover, the first neural network model is based on the InceptionV4 model; because the Inception V4 model has better classification and detection performance, the feature map obtained can better reflect the image features of the retinal image, which is conducive to more accurate classification or the recognition result.

In the first neural network model, a set of feature maps can be obtained after passing through each layer of convolutional layer (the feature maps corresponding to different convolutional layers are usually different, but they are all feature maps for the input data (in this embodiment, it is the retinal image), which represent the features of the input data). Therefore, when transfer-learning these modules in the first neural network model, any module capable of generating a feature map can be selected; preferably, the specific transfer-learned module can be selected according to the actual training effect, and there is no specific limitation here.

Optionally, when selecting a module that has been trained to generate feature maps in the first neural network model, if a module in the middle of the first neural network model is selected, all other modules that are linked to the front of this module need to be transferred to the second neural network model. For example, if the feature map obtained by the first Inception module is selected as the feature map acquired in the second neural network model, the first Inception module and the basic convolutional layer module and the mixed layer module before it need to be transferred to the second neural network model. For another example, if the feature map obtained by the third Inception module is selected as the feature map acquired in the second neural network model, the third Inception module and the basic convolutional layer module, the mixed layer module, the first Inception module, and the second Inception module before it are all transferred to the second neural network model together; and so on; which will not be repeated here.

In addition, after the transferring is completed, other modules of the second neural network model, such as the region-of-interest acquisition module, the alignment module, and the output module, are linked subsequent to the modules selected from the first neural network model, and then they are trained as a whole using the training dataset, finally obtaining the second neural network model.

Step 132: obtaining multiple regions of interest (RoIs) from the feature map by using a region proposal network (RPN) algorithm. Wherein, each region of interest corresponds to a possible detection target (e.g., a location where a lesion may be present).

In this step, the region proposal network algorithm usually first selects multiple proposal regions from the feature map, and then performs binary classification (that is, the proposal regions are divided into foreground (that is, there is no object in it) and background (that is, there is/are an object/objects in it) by setting a threshold) and Boundary Box regression on the proposal regions, so as to filter the multiple proposal regions (wherein, the binary classification is used to delete or discard the proposal regions belonging to the background, and the Boundary Box Regression is used to delete or discard the proposal regions that do not meet the requirements), and finally obtain the region(s) of interest (RoI), where the proposal region(s) retained after the filtering is/are the region(s) of interest.

Step 133: performing region-of-interest alignment processing (RoI Align) on each of the regions of interest to obtain an aligned feature map of each of the regions of interest. Wherein, the RoI Align is a regional feature aggregation method proposed in the Mask R-CNN algorithm.

Optionally, the RoI Align includes: first, aligning the pixels of the retina image with the pixels of the feature map of the retina image, and then aligning the feature map of the region of interest with the fixed feature of the region of interest. When aligning the retinal image with the feature map and aligning the feature map of the region of interest with the feature of the region of interest, the pixel values are all calculated by a bilinear interpolation algorithm.

Step 134: processing the aligned feature map of each of the regions of interest by using a Faster RCNN algorithm based on a fully convolutional network (FCN), to obtain classification information of each of the regions of interest, a coordinate position of each of the regions of interest, and a mask of each of the regions of interest, respectively. Wherein, the fully convolutional network is a network in which the full connected layers are replaced with the convolutional layers so as to convolve the object.

In this way, by using the above second neural network model, the classification result obtained is more detailed. The image segmentation result may include the classification of the region of interest, the coordinate position of the region of interest, and the mask of the region of interest. At the same time, the number of regions of interest can also be obtained. Optionally, when the retinal image recognition method is applied to the retinopathy recognition, the image segmentation result obtained by the second neural network model may include information such as the type, location, and quantity of lesions, which is of more reference value.

Optionally, the classification of the region of interest includes at least one of a degree of retinopathy and a type of retinopathy; the preset condition is a presence of retinopathy.

For example, the degree of retinopathy includes: no lesion, mild lesion, moderate lesion, severe lesion, and deep lesion. For another example, the type of retinopathy includes: microangioma, ecchymosis, cotton-wool spot, microvascular abnormality, venous beading, preretinal hemorrhage, and neovascularization.

Step 14: generating a recognition result of the retinal image according to the image segmentation result and in combination with a decision tree model. In this way, the features of the decision tree can be used to realize the subdivision of the recognition result.

Figure 2F:
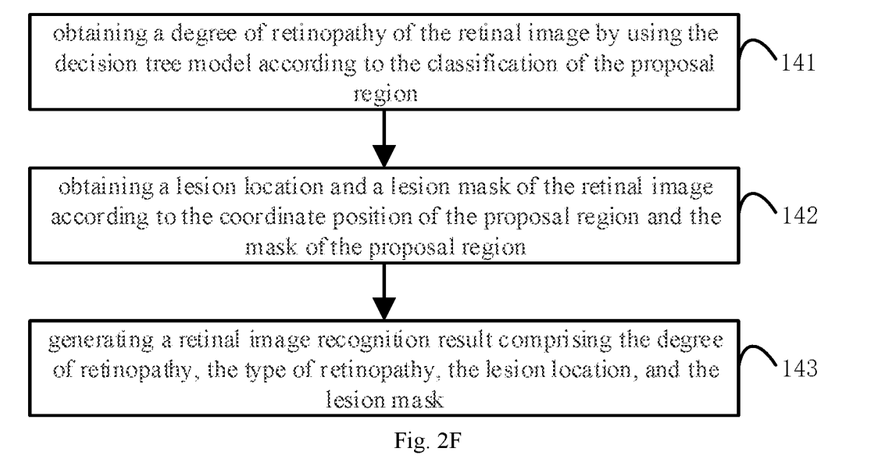
FIG. 2F is a schematic flowchart of generating a recognition result in the retinal image recognition method according to an embodiment of the disclosure.

Optionally, as shown in FIG. 2F, the generating the recognition result of the retinal image according to the image segmentation result and in combination with the decision tree model includes:

Step 141: obtaining a degree of retinopathy of the retinal image by using the decision tree model according to the classifications of the regions of interest.

Figure 2G:
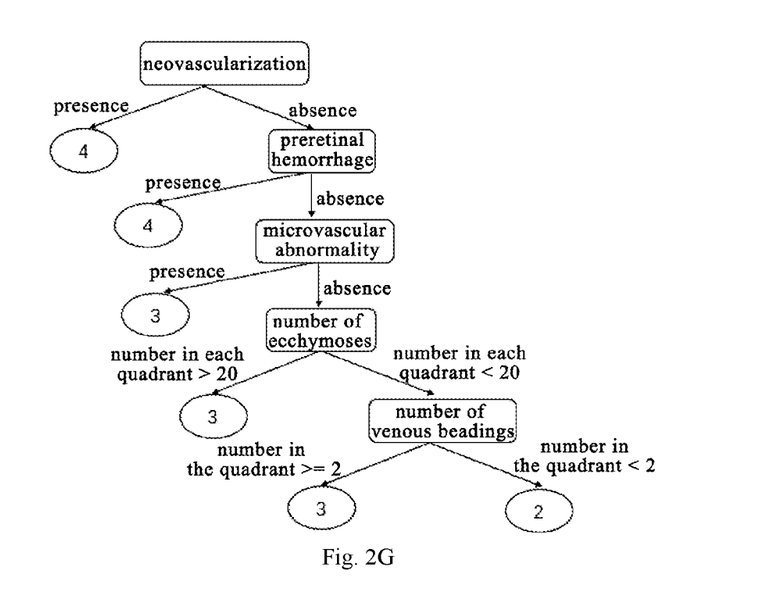
FIG. 2G is a schematic flowchart of classifying decision tree models in the retinal image recognition method according to an embodiment of the disclosure.

Optionally, FIG. 2G shows a process of recognizing the degree of retinopathy and the type of retinopathy using the trained decision tree model according to the classification of the region of interest in this embodiment.

The decision tree model is a classification model, which can be obtained by training the labeled retinal image sample, and the trained decision tree model can be used to classify retinal images. Because the classification information of the region of interest has been obtained after the processing by the second neural network model, the classification information of the region of interest is input into the decision tree model and the classification result characterizing the degree of retinopathy can be output accordingly. Wherein, when training the decision tree model, the labeling content of the training sample of the retinal image may include: the degree of retinopathy and the type of retinopathy; wherein, the degree of retinopathy may include moderate lesion, severe lesion, and deep lesion; the type of retinopathy may include: microangioma, ecchymosis, cotton-wool spot, microvascular abnormality, venous beading, preretinal hemorrhage, and neovascularization.

For example, the structure of the final decision tree model is shown in FIG. 2G. When the type of retinopathy is neovascularization and is preretinal hemorrhage, the corresponding degree of retinopathy is deep lesion, and the classification label corresponding to the deep lesion is 4; when the type of retinopathy is that the number of ecchymoses in each quadrant exceeds a threshold and is microvascular abnormality, the corresponding degree of retinopathy is severe lesion, and the classification label corresponding to the severe lesion is 3; when the type of retinopathy is that the number of venous beadings in any quadrant exceeds a threshold, the corresponding degree of retinopathy is severe lesion, the classification label corresponding to the severe lesion is 3; the remaining retinopathy types corresponds to moderate lesion, and the corresponding classification label is 2.

For example, as shown in FIG. 2G, when there is a region of interest classified as neovascularization in the image segmentation result, the classification of the degree of retinopathy in the recognition result is 4, which corresponds to deep lesion; when there is no region of interest classified as neovascularization, it is determined whether there is a region of interest classified as preretinal hemorrhage, and if so, the classification of the degree of retinopathy in the recognition result is 4, which corresponds to deep lesion; when there is no region of interest classified as preretinal hemorrhage, it is determined whether there is a region of interest classified as microvascular abnormality, and if so, the classification of the degree of retinopathy in the recognition result is 3, which corresponds to severe lesion; when there is no region of interest classified as microvascular abnormality, the number of ecchymoses in the region of interest is determined, and if the number of ecchymoses is greater than or equal to 20 in each quadrant (generally, a retinal image (or fundus image) is divided into 4 quadrants in clinical diagnosis), the classification of the degree of retinopathy in the recognition result is 3, which corresponds to severe lesion; if the number of ecchymoses in each quadrant is less than 20, the number of venous beadings in the region of interest is determined, and if the number of venous beadings in any quadrant is greater than or equal to 2, the classification of the degree of retinopathy in the recognition result is 3, which corresponds to severe lesion, otherwise, the classification of the degree of retinopathy in the recognition result is 2, which corresponds to moderate lesion. For no lesion (classification label is 0) and mild lesion (classification label is 1), they are classified as possible absence of retinopathy after the first classification (classification label is "0"), and there is no need to subdivide in this step.

Step 142: obtaining a lesion location and a lesion mask of the retinal image according to the coordinate position of the region of interest and the mask of the region of interest. In this step, the coordinate position of the region of interest corresponds to the lesion location of the retinal image, and the mask of the region of interest corresponds to the lesion mask of the retinal image. Here, it is only necessary to output the two results (that is, the coordinate position of the region of interest and the mask of the region of interest) obtained by the second neural network model.

Step 143: generating a retinal image recognition result including the degree of retinopathy, the type of retinopathy, the lesion location, and the lesion mask.

Optionally, the retinal image recognition method may further include Step 15: if the image classification result does not meet the preset condition, directly outputting the image classification result as the recognition result of the retinal image.

Optionally, if the image classification result does not meet the preset condition (for example, the image classification result is a possible absence of retinopathy, which includes two cases of no lesion and mild lesion; the classification labels 0 and 1 correspond to the two lesion severity level of no disease and mild disease respectively), a diagnosis recommendation that does not require referral can also be given. If the image classification result meets the preset condition, the classification diagnosis of fundus lesion, and the corresponding recommendations for referral and review can also be given.

It can be seen from the above embodiments that, the retinal image recognition method provided by the embodiments of the present disclosure uses the first neural network model to classify the retinal image; when the image classification result meets the preset condition, uses the second neural network model to perform retinal image segmentation; and generates the recognition result of the retinal image by using the decision tree model according to the image segmentation result; thus, by using the combination of the first neural network model and the second neural network model, and performing the recognition for the second time by using the second neural network model when the preset condition is met, the overall recognition efficiency can be improved, and a more concrete recognition result can be given when the preset condition is met.

Optionally, the retinal image recognition method may further include: outputting at least one of the image classification result, the image segmentation result, and the recognition result of the retinal image, so that at least one of the image classification result, the image segmentation result, and the recognition result is exhibited for a user's reference.

Optionally, the image classification result includes two classifications of a possible absence of retinopathy and a possible presence of retinopathy, which are used to exhibit a preliminary classification result of retinopathy.

Optionally, the image segmentation result includes the classification information of the region of interest, the coordinate position of the region of interest, and the mask of the region of interest, which are used to exhibit the classification of lesion, the location of lesion and the mask of lesion of retinopathy.

Optionally, the recognition result includes the degree of retinopathy, the type of retinopathy, the location of lesion, and the mask of lesion, which are used to exhibit comprehensive classifications of retinopathy.

Optionally, when the retinal image recognition method is applied to recognize diabetic retinopathy, the first neural network model can used to perform preliminary screening, and when the severity level of lesion is high, the second neural network model is then used to perform a more detailed recognition on the lesions, which can effectively recognize lesion points in fundus images, and provide doctors and patients with further diagnosis recommendations through the recognized lesions. In this way, through the technologies such as image processing, deep learning, etc., the technical effects of screening and classification of diabetic retinopathy can be achieved, so as to solve the problems of high misdiagnosis rate, high missed diagnosis rate and insufficient doctor experience, etc., in the screening of diabetic retinopathy.

At present, the process of recognizing and diagnosing fundus lesions takes a long time. Moreover, due to differences in experience and professional capabilities, doctors are likely to misdiagnose or miss fundus lesions. The establishment of a deep learning network model to analyze fundus images can not only quickly recognize lesions in the image, but also reduce the probability of misdiagnosis and missed diagnosis. In practical applications, this method can assist doctors in diagnosis, and can provide support for more in-depth lesion analysis in subsequent analysis.

Figure 2H:
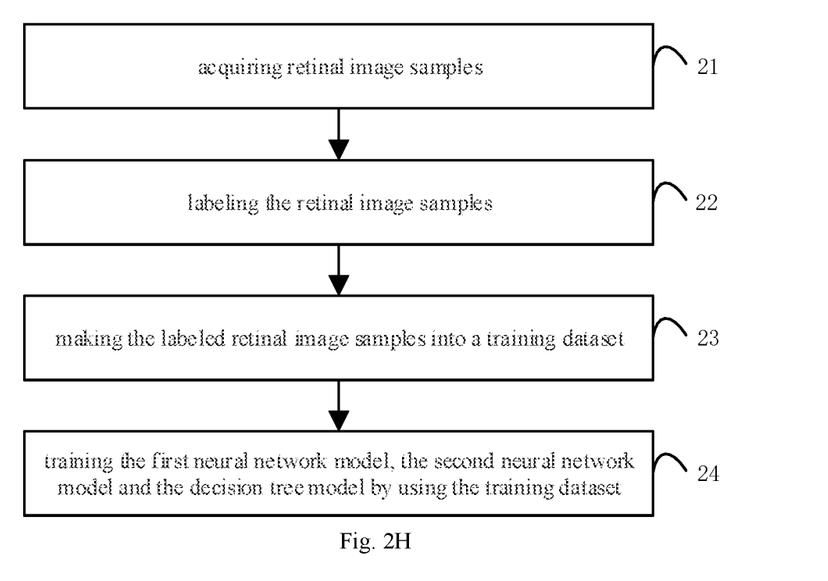
FIG. 2H is a schematic flowchart of creating a training dataset in the retinal image recognition method according to an embodiment of the disclosure.

As an embodiment of the present disclosure, as shown in FIG. 2H, the retinal image recognition method may further include:

Step 21: acquiring retinal image samples; for example, existing retinal images can be retrieved as samples from various databases in related technologies;

Step 22: labeling the retinal image samples; labeling content includes: the degree of retinopathy and the type of retinopathy; wherein, the degree of retinopathy includes no lesion, mild lesion, moderate lesion, severe lesion, and deep lesion; the type of retinopathy includes microangioma, ecchymosis, cotton-wool spot, microvascular abnormality, venous beading, preretinal hemorrhage, and neovascularization;

Step 23: making the labeled retinal image samples into a training dataset;

Step 24: training the first neural network model, the second neural network model and the decision tree model using the training dataset.

Optionally, in the step of labeling retinal image samples, an experienced professional ophthalmologist can label a desensitized fundus image, and then make the labeled image data into a training dataset.

As an embodiment of the present disclosure, the retinal image recognition method further includes:

performing image data enhancement processing on the retinal image samples; wherein, methods for the image data enhancement processing include at least one of: rotating the image, cutting the image, changing the color difference of the image, distorting the image feature, changing the image size, and enhancing image noise.

Through the above image preprocessing steps, the retinal image training dataset can be enriched, the image features can be better extracted, and it is beneficial to generalize the model (to prevent the model from overfitting).

In order to improve the precision of the model, the learning rate, impulse and other parameters can also be tuned repeatedly to optimize the prediction accuracy of the model. In the present disclosure, the finally generated model is applied to the preprocessing step of retinal image processing, which can effectively determine the lesion points in the retinal image.

It should be noted that the method in the embodiment of the present disclosure may be executed by a single device, such as a computer or a server. The method of this embodiment may also be applied in a distributed scenario, and is implemented by multiple devices cooperating with each other. In this distributed scenario, each of the multiple devices may only execute one or more steps in the method of the embodiment of the present disclosure, and the multiple devices implement the method by interacting with each other.

From the above it can be seen that, the retinal image recognition method and device, electronic equipment, and storage medium provided by the embodiments of the present disclosure perform retinal image classification by using the first neural network model, perform retinal image segmentation by using the second neural network model when the image classification result meets the preset condition, and generate the recognition result of the retinal image by using the decision tree model according to the image segmentation result; thus, by using the combination of the first neural network model and the second neural network model, and performing the recognition for the second time by using the second neural network model when the preset condition is met, the overall recognition efficiency can be improved, and a more concrete recognition result can be given when the preset condition is met.

In addition, by establishing a deep learning network model to analyze a fundus image, not only can the lesions in the image be quickly recognized, but also the probability of misdiagnosis and missed diagnosis can be reduced. In prac- FIG. 3 shows a schematic structural diagram of a retinal image recognition device according to an embodiment of the disclosure.

Figure 3:
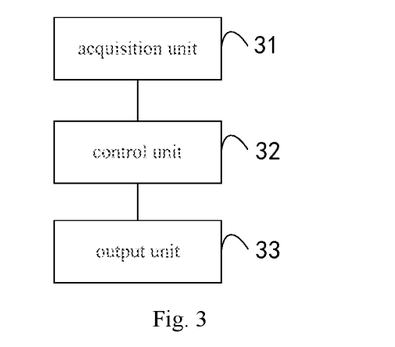
FIG. 3 is a schematic structural diagram of a retinal image recognition device according to an embodiment of the disclosure.

As shown in FIG. 3, the retinal image recognition device includes:
an acquisition unit 31 configured to acquire a retinal image; optionally, the acquisition unit 31 may be a professional retinal examination instrument, or any device with an image acquisition function (e.g., a mobile phone camera);
a control unit 32 configured to classify the retinal image by using a first neural network model to obtain an image classification result; if the image classification result meets a preset condition, to segment the retinal image by using a second neural network model to obtain an image segmentation result; and, to generate a recognition result of the retinal image according to the image segmentation result and in combination with a decision tree model;
an output unit 33 configured to output at least one of the image classification result, the image segmentation result, and the recognition result of the retinal image; optionally, the output unit 33 may be a device with a display function, so that at least one of the image classification result, the image segmentation result, and the recognition result of the retinal image can be displayed on the screen for the user to observe; optionally, the output unit 33 may also be a speaker, which outputs through voice.

From the above embodiment it can be seen that, the retinal image recognition device provided by the embodiment of the present disclosure performs retinal image classification by using the first neural network model, performs retinal image segmentation by using the second neural network model when the image classification result meets the preset condition, and generates the recognition result of the retinal image by using the decision tree model according to the image segmentation result; thus, by using the combination of the first neural network model and the second neural network model, and performing the recognition for the second time by using the second neural network model when the preset condition is met, the overall recognition efficiency can be improved, and a more concrete recognition result can be given when the preset condition is met.

Optionally, the first neural network model is based on an Inception V4 model, and includes an input layer, a basic convolutional layer module, a mixed layer module, a first Inception module, a second Inception module, a third Inception module, an average pooling module, a first convolutional layer, a first identical distribution processing layer, a max pooling layer, a second convolutional layer, a second identical distribution processing layer, and an output layer that are provided sequentially; the first neural network model uses a cross-entropy function as a loss function.

Optionally, the control unit 32 includes: a feature extraction module, a region-of-interest acquisition module, an alignment module, and an output module; the feature extraction module is configured to acquire a feature map corresponding to the retinal image; the region-of-interest acquisition module is configured to obtain multiple regions of interest from the feature map by using a region proposal network algorithm; the alignment module is configured to perform region-of-interest alignment processing on each of the regions of interest to obtain an aligned feature map of each of the regions of interest; the output module is configured to process the feature map of each of the regions of interest by using a Faster RCNN algorithm based on a fully convolutional network, to obtain a classification of each of the regions of interest, a coordinate position of each of the regions of interest, and a mask of each of the regions of interest.

Optionally, the second neural network model includes: a feature extraction module, a region-of-interest acquisition module, an alignment module, and an output module; the feature extraction module is configured to acquire a feature map corresponding to the retinal image;
wherein the feature extraction module is obtained by the following method:
selecting a module capable of generating feature maps from the trained first neural network model;
transferring the selected module to the second neural network model as the feature extraction module; wherein, the selected module includes at least one of a basic convolutional layer module, a mixed layer module, a first Inception module, a second Inception model, and a third Inception module.

Optionally, the image classification result includes a presence of retinopathy and an absence of retinopathy; the image segmentation result includes a classification of the region of interest, a coordinate position of the region of interest, and a mask of the region of interest; the classification of the region of interest includes the type of retinopathy; the preset condition is the presence of retinopathy.

Optionally, the degree of retinopathy includes: no lesion, mild lesion, moderate lesion, severe lesion, and deep lesion; the type of retinopathy includes: microangioma, ecchymosis, cotton-wool spot, microvascular abnormality, venous beading, preretinal hemorrhage, and neovascularization;
the control unit 32 is configured to:
obtain a degree of retinopathy of the retinal image by using the decision tree model according to the classification of the region of interest;
obtain a lesion location and a lesion mask of the retinal image according to the coordinate position of the region of interest and the mask of the region of interest;
generate a retinal image recognition result including the degree of retinopathy, the type of retinopathy, the lesion location, and the lesion mask.

Optionally, the control unit 32 is configured to:
acquire retinal image samples;
label the retinal image samples; labeling content includes: the degree of retinopathy and the type of retinopathy; wherein, the degree of retinopathy includes no lesion, mild lesion, moderate lesion, severe lesion, and deep lesion; the type of retinopathy includes microangioma, ecchymosis, cotton-wool spot, microvascular abnormality, venous beading, preretinal hemorrhage, and neovascularization;
make the labeled retinal image samples into a training dataset;
train the first neural network model, the second neural network model and the decision tree model using the training dataset.

Optionally, the control unit 32 is configured to:
perform image data enhancement processing on the retinal image samples; wherein, methods for the image data enhancement processing include at least one of: rotating the image, cutting the image, changing the color difference of the image, distorting the image feature, changing the image size, and enhancing image noise.

The modules/units described in the embodiment can be implemented in software or hardware. The described modules may also be provided in a processor, for example, it may be described as: a processor including a receiving module, a determining module, and so on. Wherein, the names of these modules do not constitute a limitation on the modules themselves under certain circumstances.

The device in the above embodiment is used to implement the corresponding method in the foregoing embodiment, and has the beneficial effects of the corresponding method embodiment, which will not be repeated here.

Figure 4:
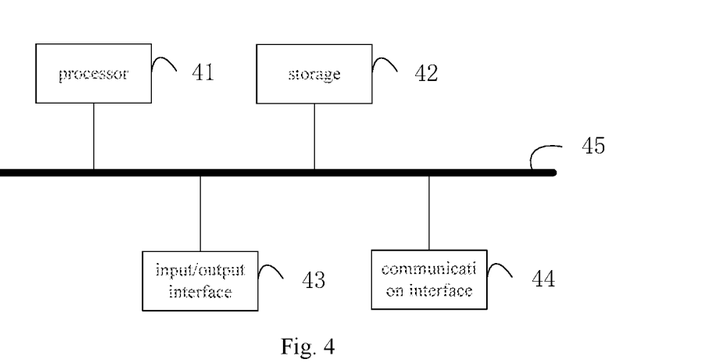
FIG. 4 is a schematic diagram of the hardware structure of an electronic equipment according to an embodiment of the disclosure.

FIG. 4 shows a schematic structural diagram of a more specific hardware of an electronic equipment provided by the embodiment. The equipment may include a processor 41, a storage 42, an input/output interface 43, a communication interface 44, and a bus 45. The communication connections between the processor 41, the storage 42, the input/output interface 43, and the communication interface 44 within the equipment are implemented through the bus 45.

The processor 41 may be implemented by a general-purpose central Central Processing Unit (CPU), a microprocessor, an Application Specific Integrated Circuit (ASIC), or one or more integrated circuits, etc., for executing a related program to implement the technical solutions provided in the embodiments of this specification.

The storage 42 may be implemented in the form of a Read Only Memory (ROM), a Random Access Memory (RAM), a static storage device, a dynamic storage device, and the like. The storage 42 may store an operating system and other application programs. When the technical solutions provided in the embodiments of the present specification are implemented by software or firmware, the related program codes are stored in the storage 42, and called and executed by the processor 41.

The input/output interface 43 is used to connect an input/output module to realize information input and output. The input/output module may be configured in the equipment as a component (not shown in the figure), or it can be externally connected to the equipment to provide corresponding functions. An input device may include a keyboard, a mouse, a touch screen, a microphone, various sensors, etc., and an output device may include a display, a speaker, a vibrator, an indicator light, and the like.

The communication interface 44 is used to connect a communication module (not shown in the figure) to realize the communication interaction between the equipment and other equipments. The communication module may realize communication through wired means (such as USB, network cable, etc.), or through wireless means (such as mobile network, WIFI, Bluetooth, etc.).

The bus 45 includes a path to transmit information between various components (for example, the processor 41, the storage 42, the input/output interface 43, and the communication interface 44) of the equipment.

It should be noted that, although only the processor 41, the storage 42, the input/output interface 43, the communication interface 44, and the bus 45 are shown in the above equipment, in a specific implementation, the equipment may also include other required components for normal operation. In addition, those skilled in the art will understand that the above equipment may also include only the components necessary to implement the solutions of the embodiments of the present specification, and not necessarily include all the components shown in the figures.

A computer-readable medium in the embodiment includes permanent and non-permanent, removable and non-removable media, and information storage can be realized by any method or technology. The information may be computer-readable instructions, data structures, program modules, or other data. An example of the computer storage medium includes, but is not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a CD-ROM, a digital versatile disc (DVD) or other optical storage, a magnetic cassette, a magnetic tape storage or other magnetic storage device, or any other non-transmission medium which can be used to store information that can be accessed by computing devices.

Those of ordinary skill in the art should understand that, the discussion of any of the above embodiments is only exemplary, and is not intended to imply that the scope of the present disclosure (including the claims) is limited to these examples; under the conceive of the present disclosure, the above embodiments or the technical features in different embodiments can also be combined, the steps can be implemented in any order, and there are many other changes in different aspects of the present disclosure as described above, and they are not provided in details for the sake of brevity.

In addition, in order to simplify the description and discussion, and in order not to obscure the present disclosure, the well-known power/ground connections to integrated circuit (IC) chips and other components may or may not be shown in the provided drawings. In addition, the devices may be shown in the form of block diagrams in order to avoid making the present disclosure difficult to understand, and this also takes into account the fact that the details of the implementations of these block diagram devices are highly dependent on the platform on which the present disclosure will be implemented (i.e., these details should be fully within the understanding of those skilled in the art). In the case where specific details (for example, circuits) are set forth to describe exemplary embodiments of the present disclosure, it is obvious to those skilled in the art that the present disclosure may be implemented without these specific details or when these specific details are changed. Therefore, these descriptions should be considered illustrative rather than restrictive.

Although the present disclosure has been described in conjunction with specific embodiments of the present disclosure, many substitutions, modifications and variations of these embodiments will be apparent to those of ordinary skill in the art based on the foregoing description. For example, other memory architectures (e.g., a dynamic RAM (DRAM)) can use the discussed embodiments.

The embodiments of the present disclosure are intended to cover all such substitutions, modifications, and variations that fall within the broad scope of the appended claims. Therefore, any omission, modification, equivalent replacement, improvement, etc., made within the spirit and principle of the present disclosure should be included in the protection scope of the present disclosure.

What is claimed is:

1. A retinal image recognition method, comprising:
  acquiring a retinal image;
  classifying the retinal image by using a first neural network model to obtain an image classification result;
  if the image classification result meets a preset condition, segmenting the retinal image by using a second neural network model to obtain an image segmentation result;

generating a recognition result of the retinal image according to the image segmentation result and in combination with a decision tree model;

wherein the second neural network model is based on a Mask R-CNN model.

2. The method according to claim 1, wherein the image classification result comprises a presence of retinopathy and an absence of retinopathy.

3. The method according to claim 2, wherein the preset condition is the presence of retinopathy.

4. The method according to claim 1, wherein the first neural network model is based on an Inception V4 model, and comprises an input layer, a basic convolutional layer module, a mixed layer module, a first Inception module, a second Inception module, a third Inception module, an average pooling module, a first convolutional layer, a first identical distribution processing layer, a max pooling layer, a second convolutional layer, a second identical distribution processing layer, and an output layer that are provided sequentially.

5. The method according to claim 1, wherein a loss function of the first neural network model is a cross-entropy function.

6. The method according to claim 1, wherein the segmenting the retinal image by using the second neural network model to obtain the image segmentation result comprises:

acquiring a feature map corresponding to the retinal image;

obtaining multiple regions of interest from the feature map by using a region proposal network algorithm;

performing region-of-interest alignment processing on each of the regions of interest to obtain an aligned feature map of each of the regions of interest;

processing the aligned feature map of each of the regions of interest by using a Faster RCNN algorithm based on a fully convolutional network, to obtain classification information of each of the regions of interest, a coordinate position of each of the regions of interest, and a mask of each of the regions of interest.

7. The method according to claim 6, wherein the acquiring the feature map corresponding to the retinal image further comprises:

selecting a module capable of generating feature maps from the trained first neural network model;

transferring the selected module to the second neural network model to acquire the feature map corresponding to the retinal image; wherein, the selected module comprises at least one of a basic convolutional layer module, a mixed layer module, a first Inception module, a second Inception model, and a third Inception module.

8. The method according to claim 6, wherein, the image segmentation result comprises the classification of the region of interest, the coordinate position of the region of interest, and the mask of the region of interest;

the classification of the region of interest comprises a type of retinopathy.

9. The method according to claim 8, wherein the generating the recognition result of the retinal image according to the image segmentation result and in combination with the decision tree model comprises:

obtaining a degree of retinopathy of the retinal image by using the decision tree model according to the classification of the region of interest;

obtaining a lesion location and a lesion mask of the retinal image according to the coordinate position of the region of interest and the mask of the region of interest;

generating a retinal image recognition result comprising the degree of retinopathy, the type of retinopathy, the lesion location, and the lesion mask.

10. The method according to claim 1, further comprising:

acquiring retinal image samples;

labeling the retinal image samples;

making the labeled retinal image samples into a training dataset;

training the first neural network model, the second neural network model and the decision tree model using the training dataset.

11. The method according to claim 10, further comprising:

performing image data enhancement processing on the retinal image samples; wherein, methods for the image data enhancement processing comprises at least one of: rotating an image, cutting an image, changing a color difference of an image, distorting an image feature, changing an image size, and enhancing image noise.

12. The method according to claim 1, further comprising:

outputting at least one of the image classification result, the image segmentation result, and the recognition result of the retinal image.

13. A non-transitory computer readable storage medium, wherein the non-transitory computer readable storage medium stores computer instructions which cause the computer perform the method according to claim 1.

14. An electronic equipment comprising a storage, a processor, and a computer program stored on the storage and capable of running on the processor, wherein, when executing the computer program, the processor implements a retinal image recognition method, the method comprising:

acquiring a retinal image;

classifying the retinal image by using a first neural network model to obtain an image classification result;

if the image classification result meets a preset condition, segmenting the retinal image by using a second neural network model to obtain an image segmentation result;

generating a recognition result of the retinal image according to the image segmentation result and in combination with a decision tree model;

wherein the second neural network model is based on a Mask R-CNN model.

15. The electronic equipment according to claim 14, wherein the first neural network model is based on an Inception V4 model, and comprises an input layer, a basic convolutional layer module, a mixed layer module, a first Inception module, a second Inception module, a third Inception module, an average pooling module, a first convolutional layer, a first identical distribution processing layer, a max pooling layer, a second convolutional layer, a second identical distribution processing layer, and an output layer that are provided sequentially.

16. The electronic equipment according to claim 14, wherein a loss function of the first neural network model is a cross-entropy function.

17. The electronic equipment according to claim 14, wherein the segmenting the retinal image by using the second neural network model to obtain the image segmentation result comprises:

acquiring a feature map corresponding to the retinal image;

obtaining multiple regions of interest from the feature map by using a region proposal network algorithm;

performing region-of-interest alignment processing on each of the regions of interest to obtain an aligned feature map of each of the regions of interest;

processing the aligned feature map of each of the regions of interest by using a Faster RCNN algorithm based on a fully convolutional network, to obtain classification information of each of the regions of interest, a coordinate position of each of the regions of interest, and a mask of each of the regions of interest.

18. The electronic equipment according to claim 17, wherein the acquiring the feature map corresponding to the retinal image further comprises:

selecting a module capable of generating feature maps from the trained first neural network model;

transferring the selected module to the second neural network model to acquire the feature map corresponding to the retinal image; wherein, the selected module comprises at least one of a basic convolutional layer module, a mixed layer module, a first Inception module, a second Inception model, and a third Inception module.

* * * * *